United States Patent [19]

Quelch

[11] 4,109,803
[45] Aug. 29, 1978

[54] METHOD AND APPARATUS FOR DE-STACKING TRAYS

[76] Inventor: Alan Ralph Quelch, 16 George St., North, Cambridge (Galt), Ontario, Canada, N1S 2M8

[21] Appl. No.: 768,757

[22] Filed: Feb. 14, 1977

[51] Int. Cl.$^2$ .............................................. B65G 59/06
[52] U.S. Cl. ................................. 214/8.5 D; 214/152; 221/211; 271/102
[58] Field of Search ............. 214/8.5 D, 8.5 A, 8.5 R, 214/152; 221/211; 271/11, 15, 102

[56] References Cited

U.S. PATENT DOCUMENTS

| | | | |
|---|---|---|---|
| 2,545,396 | 3/1951 | Wahl | 214/1 BV X |
| 3,511,395 | 4/1968 | Brown | 214/8.5 D X |

*Primary Examiner*—Drayton E. Hoffman
*Assistant Examiner*—George F. Abraham

[57] ABSTRACT

A method and apparatus for destacking trays from a nest, in which the nest when inverted, bears against a suction plate covering the lowermost tray to form a closed chamber. The nest is clamped and negative pressure is applied to the closed chamber through the suction plate which is withdrawn carrying the adhering lowermost tray with it. The negative pressure is then released and the tray falls away from the suction plate.

13 Claims, 6 Drawing Figures

METHOD AND APPARATUS FOR DE-STACKING TRAYS

This invention relates to a device for removing trays individually from a stack of nested trays.

Apparatus presently in use de-stacks trays from a nest by using one or more suction cups which grip the inside surface of the bottom of each tray to remove it from the stack. Examples of such apparatus are disclosed in U.S. Pat. No. 3,275,189 issued Sept. 27, 1966 in the name of L. H. G. Goldsborough et al. and U.S. Pat. No. 3,302,946 issued Feb. 7, 1967 in the name of P. L. Anderson. These devices are operable only upon trays having bottoms with an inner surface to which a suction cup is attachable whereas many trays such as those used to hold chocolates in discrete pockets are not suitable for adherence to suction cups. Even where the inner surface of the bottom of a tray has a particular area suitable for adherence of a suction cup the de-stacking apparatus must be modified for trays having different bottom surface contours.

The present invention overcomes this disadvantage by utilizing a movable suction plate to form a closed chamber in the lowermost tray of a stack, when inverted and then creating a vacuum in the closed chamber to cause the tray to adhere to the plate which withdraws it from the stack.

Essentially the invention consists of a method of removing trays individually from a stack of nested trays, comprising the steps of: bearing the stack when inverted against plate means covering the lowermost tray to form a closed chamber; clamping the stack, except the lowermost tray, against movement thereof; applying negative pressure through the plate means to the closed chamber; withdrawing the plate means from the stack with the lowermost tray adhering thereto by suction; releasing the negative pressure from the closed chamber whereby the adhering tray is released from the plate means.

An example embodiment of the invention is shown in the accompanying drawings in which.

Figure 1:
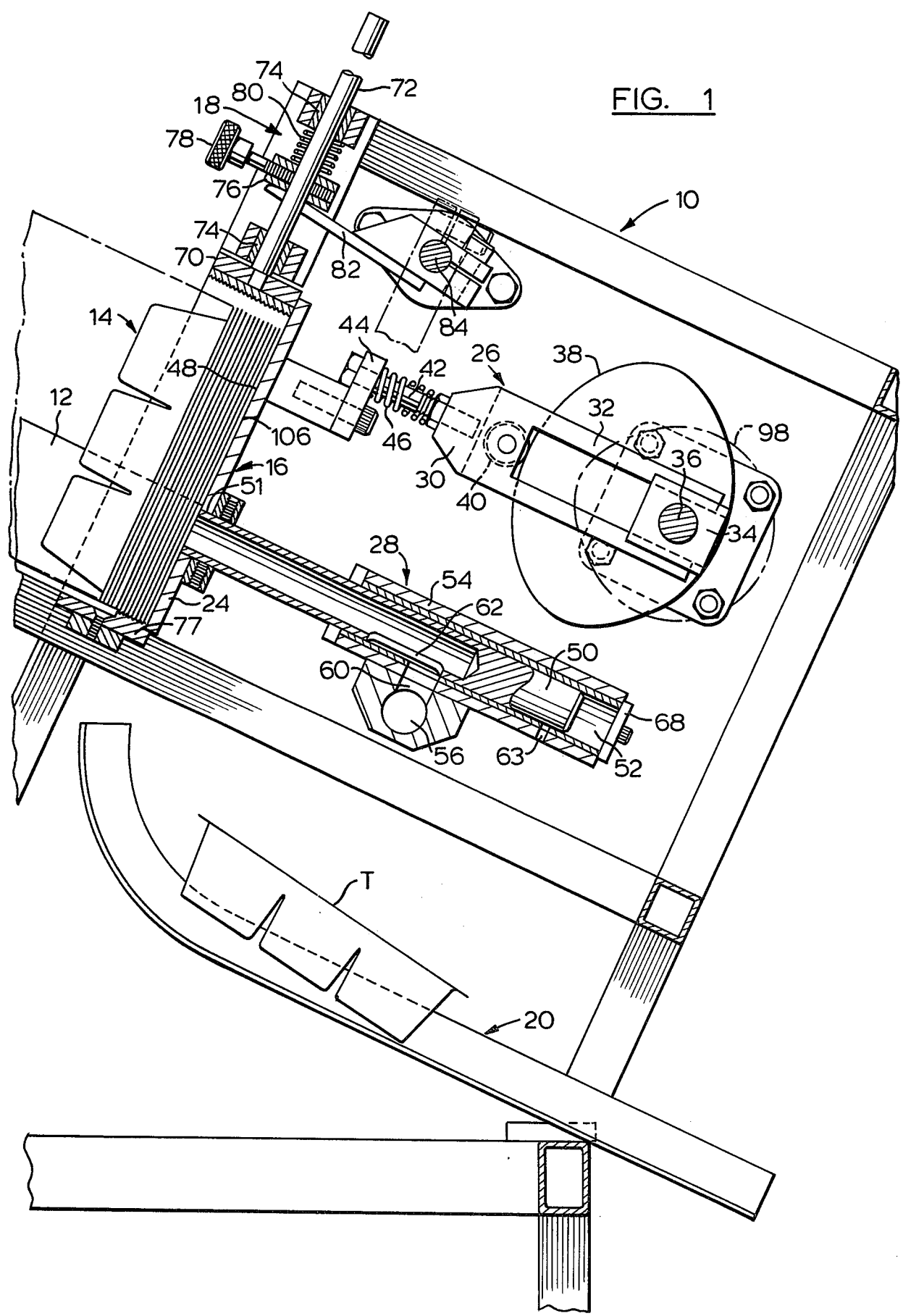
FIG. 1 is a cross-sectional side view of a de-stacking device, shown gripping a tray for removal from a stack; taken along line 1—1 of FIG. 3

The example embodiment of the drawings consists of a frame 10 having a downwardly inclined guide 12 which delivers a stack 14 of nested trays against a suction assembly 16, a releasable clamp 18 for holding the stack immobile, and a chute 20 for receiving individual trays T and passing them to a point remote from the frame.

Figure 2:
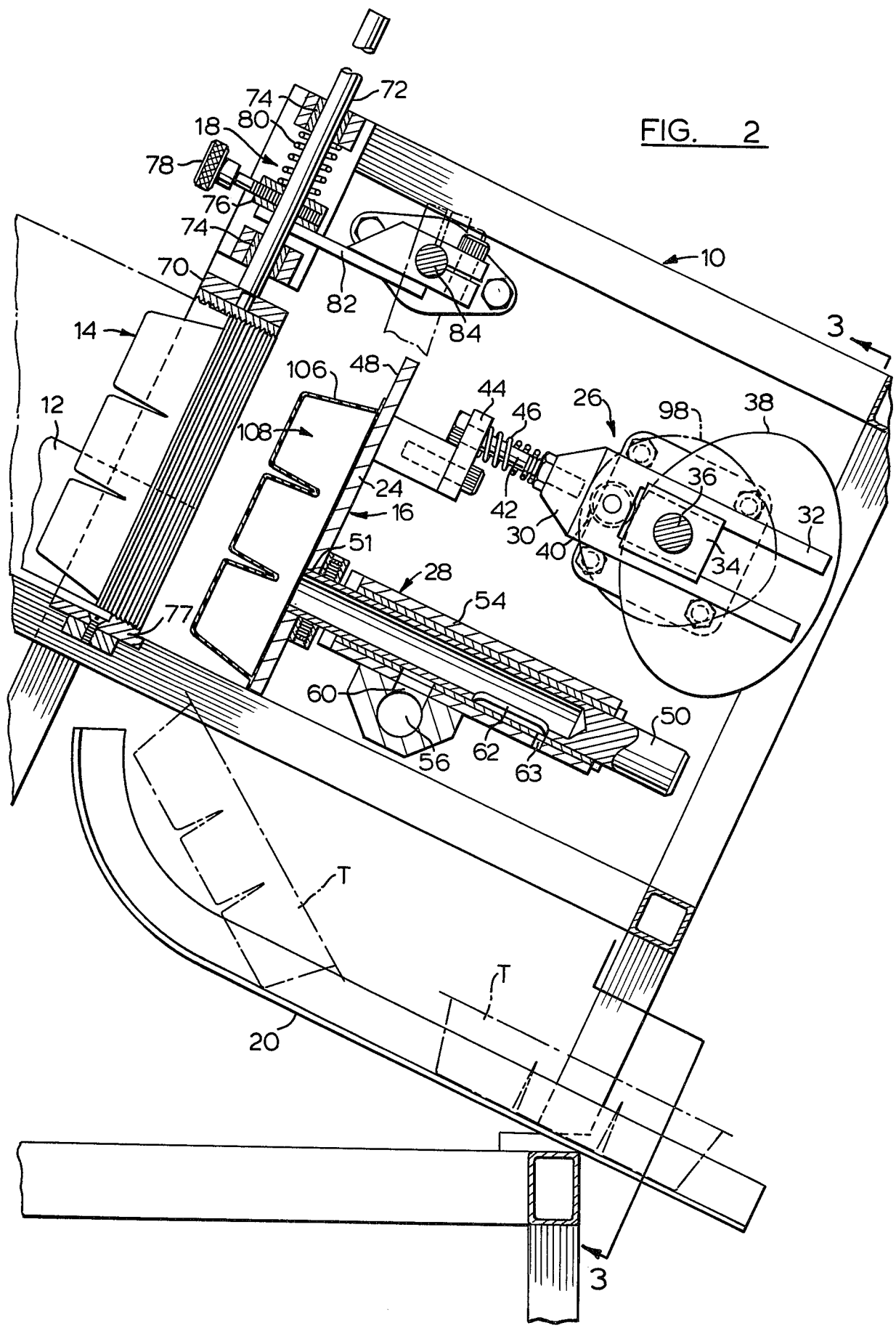
FIG. 2 shows the same view as FIG. 1 but with the lowermost tray removed from the stack and in cross-section.

Suction assembly 16 comprises a suction plate 24 mounted on a reciprocal drive assembly 26 and a vacuum delivery system 28. As seen in FIGS. 1 and 2, drive assembly 26 has a yoke 30 with legs 32 slidable in a collar 34 freely mounted on a drive shaft 36. Keyed on drive shaft 36 is an elliptical cam 38 which is in contact with a freely rotatable cam follower 40 mounted on the yoke. A bolt 42 connects yoke 30 with a flange 44 fixed to suction plate 24. Bolt 42 is slidable in flange 44 and is inhibited from sliding by a coaxial compression spring 46 which bears at one end against flange 44 and at the other end against yoke 30. Suction plate 24 has a planar face 48 although it will be appreciated that the face of the suction plate could be configured to cover a tray having a non-planar rim.

Figure 6:
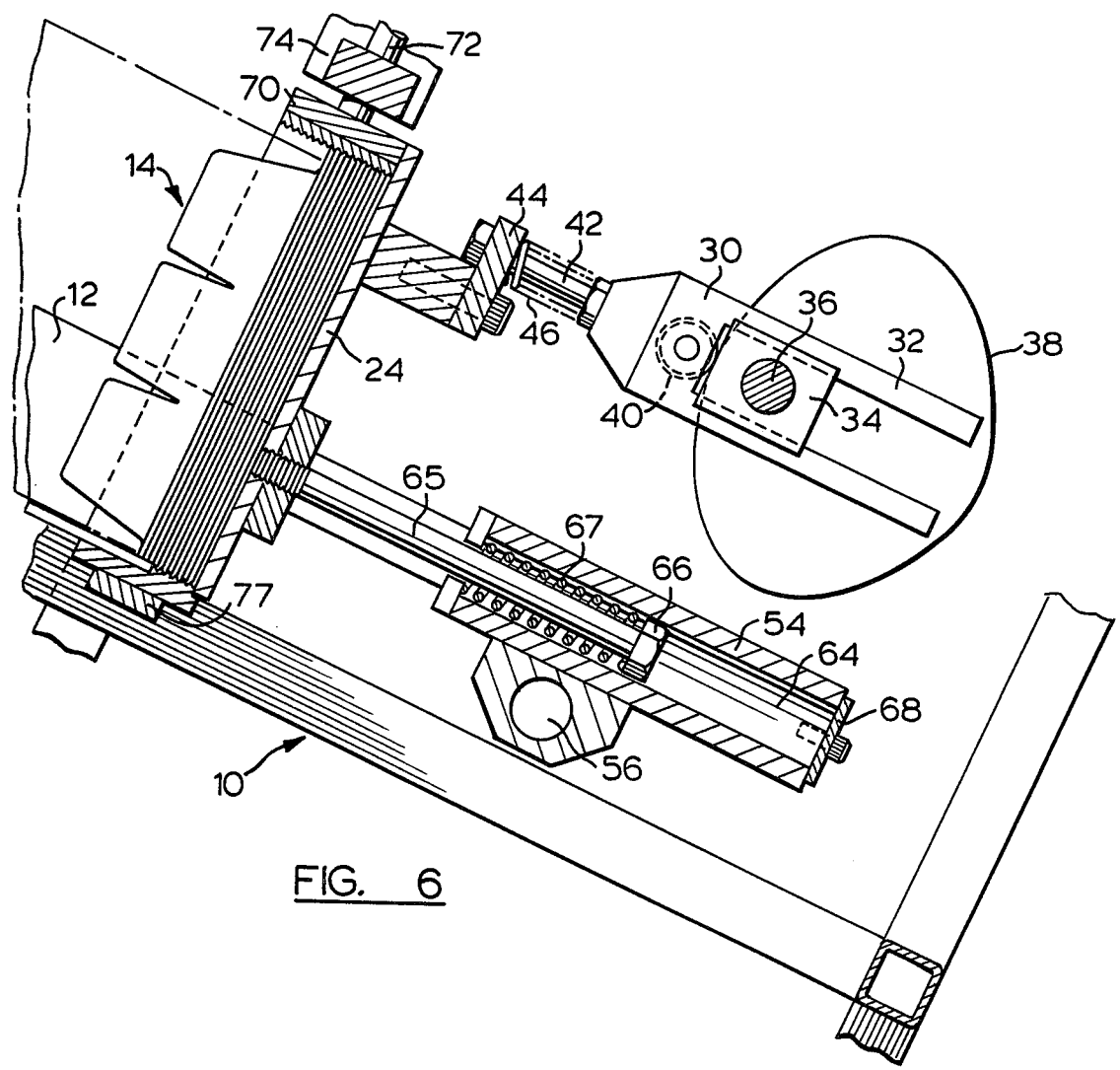
FIG. 6 is a cross-sectional view taken along line 6—6 of FIG. 3 showing the spring bias of the suction tray assembly.

Vacuum delivery system 28 comprises a pair of pipes 50 each fixed at one end to suction plate 24 and opening through an aperture 51 to face 48 of the plate. The other end of each pipe 50 is slidable in a tubular passage 52 located in a cross member 54 fixed on frame 10. A plenum chamber 56, also mounted on frame 10 below cross member 54, is connected by a hose 58 to a vacuum source (not shown). A port 60 opens from plenum chamber 56 radially into each passage 52. Each pipe 50 is closed at its end remote from plate 24 and has a slot 62 in the wall of the pipe registrable with port 60. A vent 63 opens from each passage 52 rearwardly of plenum chamber 56. As seen in FIG. 6, a further tubular passage 64 in cross member 54 carries a bolt 65 which is threaded into suction plate 24. Head 66 of bolt 65, slidable along passage 64, is urged rearwardly (in a direction away from stack 14) by a compression spring 67. Passage 64 is accessible through a keeper plate 68 mounted on the rear face of cross member 54.

Figure 4:
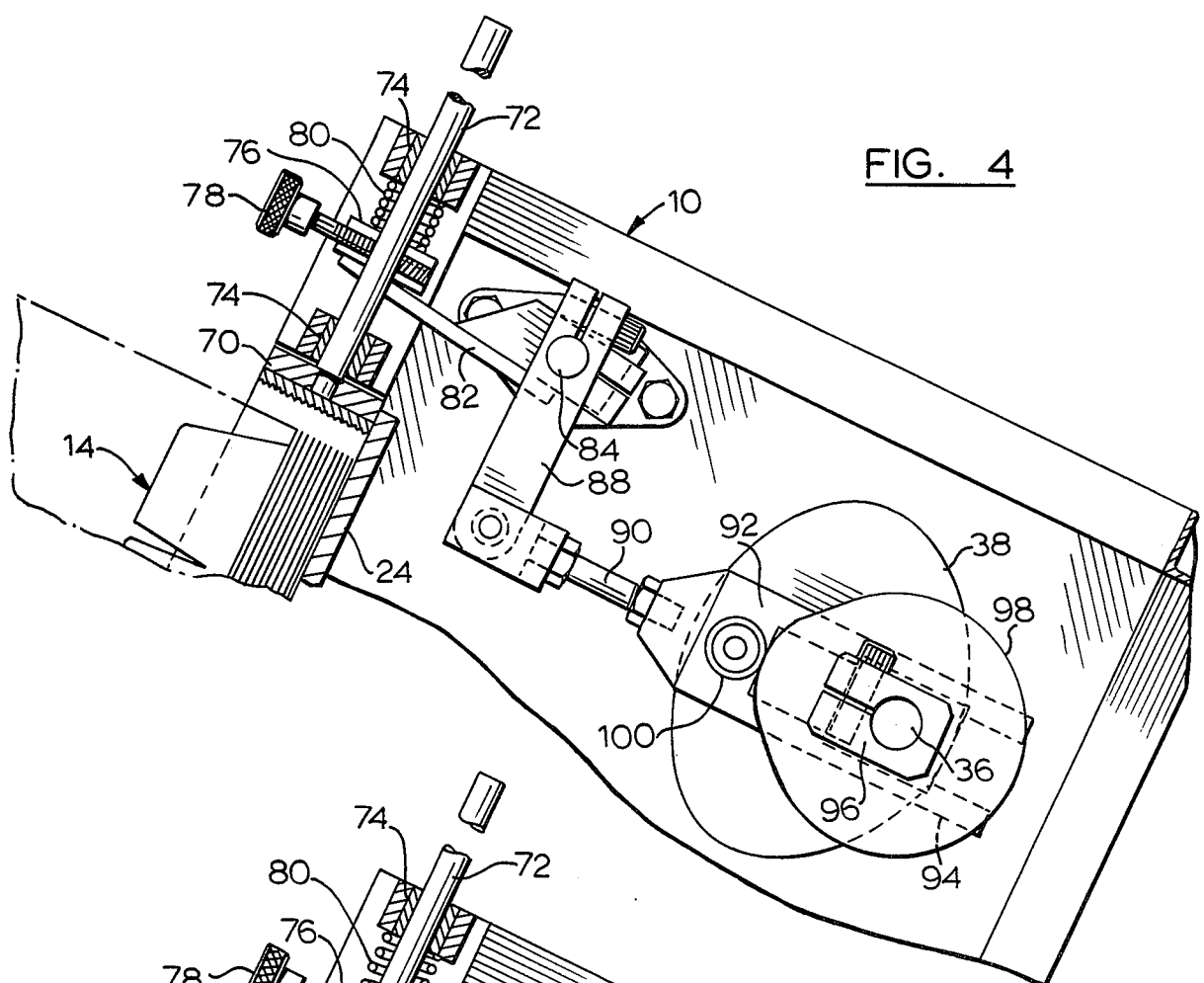
FIG. 4 is a cross-sectional view taken along line 4—4 of FIG. 3 with the clamping head in released position.
Figure 5:
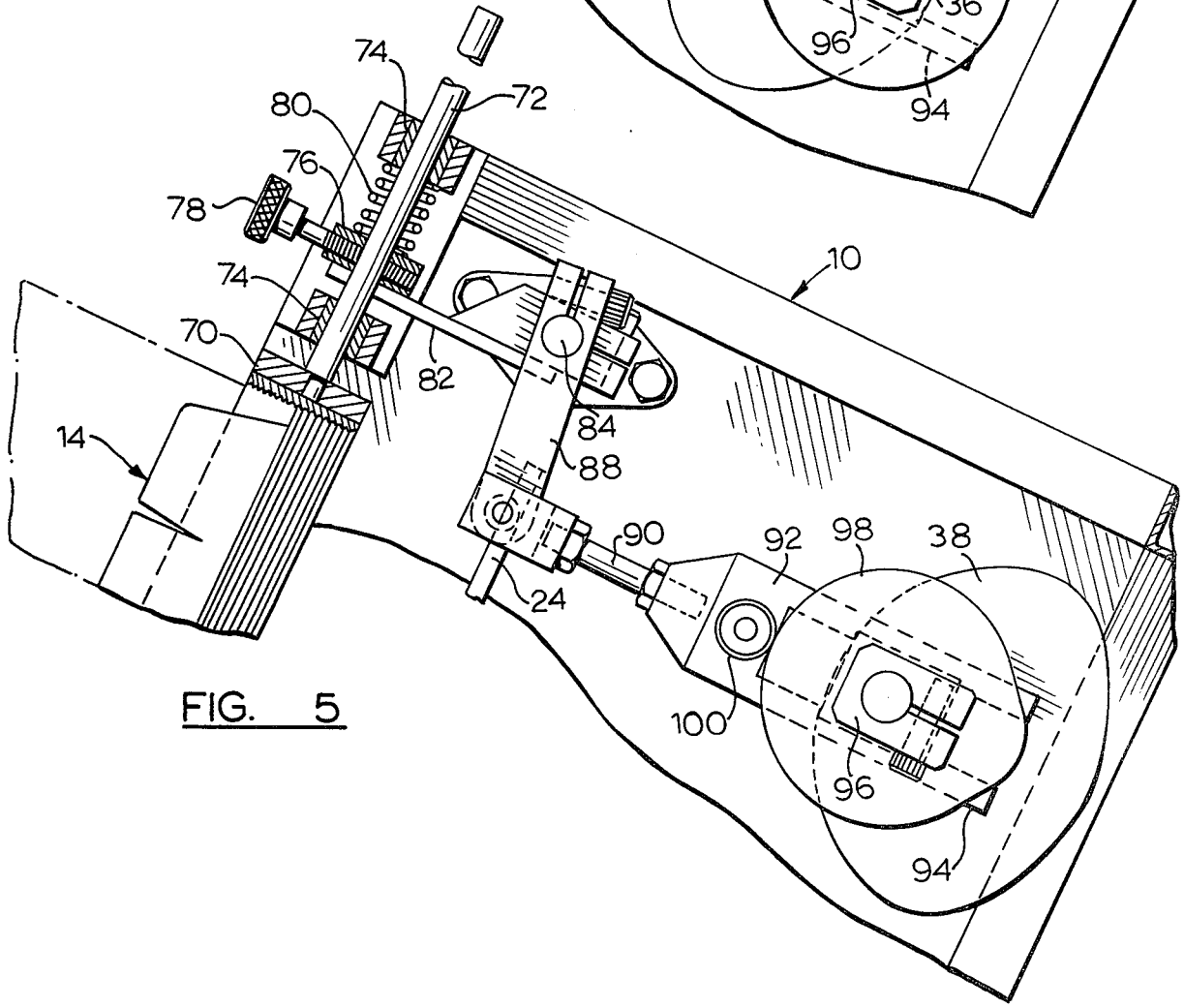
FIG. 5 is a view similar to FIG. 4 showing the clamping head advanced into engagement with the stack of trays.

Releasable clamp 18 comprises a serrated clamping head 70 fixed on the end of a pair of shafts 72 slidable in a pair of spaced bushings 74 on frame 10. A crossbar 76 is releasably clamped on shafts 72 between bushings 74 by screws 78. Head 70 is urged into an advanced position against stack 14 by compression springs 80 coaxially mounted on shafts 72, each spring bearing at one end against frame 10 and at the other end against crossbar 76. Facing clamping head 70 is a serrated clamping plate 77 fixed on frame 10. As seen particularly in FIGS. 4 and 5, a lever arm 82 bears against crossbar 76 in opposition to springs 80. Lever arm 82 is clamped radially on a shaft 84 which is mounted in bushings 86 for free rotation on frame 10. Also clamped on shaft 84 is a radial connecting arm 88 having its free end pivotally connected to a rod 90 carrying a yoke 92. Legs 94 of yoke 92 are freely slidable in a collar 96 which is in turn freely mounted on drive shaft 36. An elliptical cam 98 is fixed on drive shaft 36 and contacts a cam follower 100 rotatably mounted on yoke 92.

Figure 3:
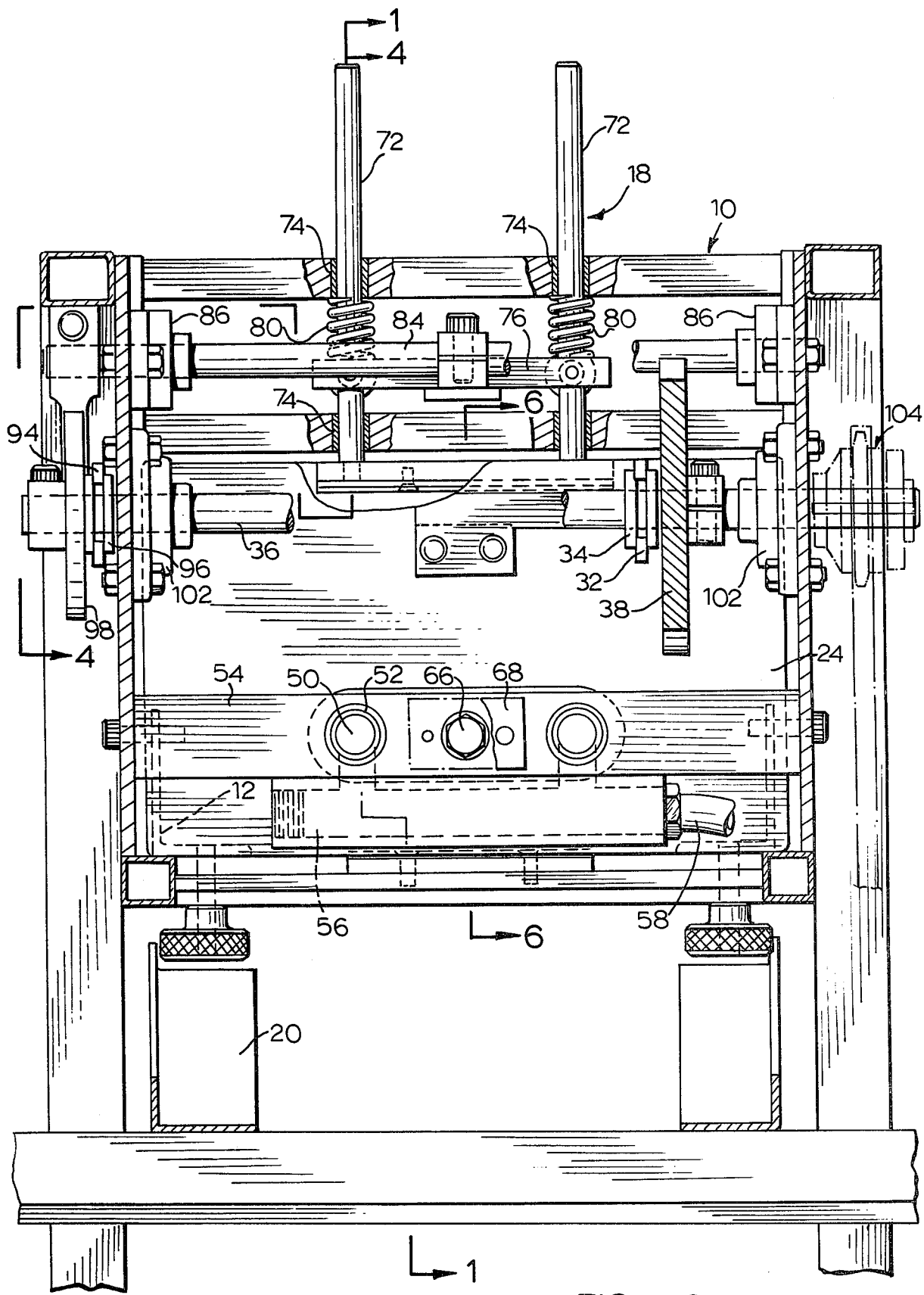
FIG. 3 is a cross-sectional view taken along line 3—3 of FIG. 2.

As seen in FIG. 3, drive shaft 36 is journally mounted in bushings 102 on frame 10 and the shaft is driven by sprocket and chain assembly 104. As seen in FIG. 1, frame 10 slopes downwardly and rearwardly from suction plate 24 which causes followers 40 and 100 to bear by gravity against cams 38 and 98 respectively.

In the operation of the example embodiment suction plate 24 is initially located in a forward position of rest and clamping head 70 is retracted laterally with respect to guide 12 as seen in FIG. 1. In its forward position suction plate 24 bears laterally along its upper and lower edges against clamping head 70 and clamping plate 77 respectively. A stack 14 of nested trays is inverted and placed in guide 12 with the planar rim of lowermost tray 106 bearing against suction plate 24 and forming with the suction plate a closed chamber 108. In its retracted position the distance of clamping head 70 from stack 14 is adjusted by screws 78. In the advanced position of suction plate 24, slot 62 in each pipe 50 registers with an associated port 60; also, with clamping head 70 retracted cams 38 and 98 are in the position shown in FIGS. 1 and 5.

On activation of sprocket and chain assembly 104, drive shaft 36 is axially rotated. The configuration of cams 38 and 98 hold suction plate 24 in its forward position against clamping plate 77 and clamping head 70 until the clamping head moves downwardly against stack 14. Because slot 62 of each pipe 50 registers with an associated port 60, the lowermost tray 106 of stack 14 adheres by suction to plate 24. The faces of clamping head 70 and clamping plate 77 are configured to leave lowermost tray 106 of stack 14 free, allowing suction plate 24 to withdraw tray 106 from the stack as the suction plate moves rearwardly under the action of cam 38 as seen in FIG. 2. As tray 106 clears stack 14 the continued rearward movement of suction plate 24 causes slot 62 of each pipe 50 to move out of registration with port 60 and into registration with vent 63, breaking the vacuum which holds tray 106 and allowing that tray to drop onto chute 20 where it slides by gravity away from frame 10.

The return of suction plate 24 to its forward position is followed by the retraction of clamping head 70 from stack 14 which allows the stack to move forwardly against the suction plate whereupon the cycle of withdrawing the lowermost tray from the stack is repeated.

In the example embodiment frame 10 is tilted upwardly and forwardly towards guide 12, allowing suction plate 24 to move rearwardly by gravity assisted by the action of compression spring 67. The forward movement of suction plate 24 is achieved by cam 38 acting against follower 40.

To sum up, the steps in the operation of the example embodiment are as follows:

(1) with suction plate 24 in its forward position bearing against clamping head 70 and clamping plate 77, and with clamping head 70 retracted, a stack 14 of nested trays is placed in guide 12 with the rim of the lowermost tray abutting face 48 of the suction plate;
(2) negative pressure or suction is created in pipe 50;
(3) clamping head 70 is advanced to grip stack 14;
(4) suction plate 24 is withdrawn rearwardly;
(5) the suction in pipe 50 is released;
(6) suction plate 24 is moved forwardly to bear again against clamping head 70 and clamping plate 77 and the cycle is repeated.

I claim:

1. A method of removing trays individually from a inverted stack of nested trays, comprising the steps of:
   releasing the inverted stack to allow it to move and bear against a plate means so that the lowermost tray forms a closed chamber therewith;
   clamping the inverted stack, except the lowermost tray, against movement thereof;
   applying negative pressure through the plate means to the closed chamber;
   withdrawing the plate means from the stack with the lowermost tray adhering thereto by suction;
   releasing the negative pressure from the closed chamber whereby the adhering tray is released from the plate means.

2. A method as claimed in claim 1 in which the stack and the plate means have inclined axes whereby the stack bears against the plate means by gravity, the plate means is withdrawn from the stack by gravity, and the tray released from the plate means falls away therefrom by gravity.

3. Apparatus for removing trays individually from a stack of nested trays comprising:
   guide means to receive and advance said stack;
   clamping means advancable to hold the inverted stack immovable except for the lowermost tray thereof and retractable to release the stack;
   plate means having a face movable into a forward position to bear against the rim of the lowermost tray of said stack, the face being configured to form with said lowermost tray a closed chamber, said plate means and face being movable also into a rearward position;
   a frame supporting the clamping means, guide means and plate means;
   means to create a vacuum in the closed chamber whereby the tray adheres to the plate means and to break the vacuum when the plate means is moved into a rearward position whereby the adhering tray is released from the plate means; and
   means to move the plate means and the clamping means cyclically through said positions whereby the clamping means holds the stack while the plate means is moved rearwardly to withdraw the lowermost tray from the stack and releases the stack to allow the stack to advance to meet the face of the plate means when the plate means is in a forward position.

4. Apparatus as claimed in claim 3 in which the rim of each tray lies in a plane and the face of the plate means is planar.

5. Apparatus as claimed in claim 3 in which the means to move the plate means and the clamping means comprises a pair of cams and drive means for the cams, the plate means and the clamping means each including a follower spring biased one against each of the cams.

6. Apparatus as claimed in claim 3 in which the plate means comprises a suction plate mounted transversely on one end of at least one tube slidable in a passage in a cross member fixed on the frame, the passage being connected to a source of negative pressure, and means to cut off the source when the tube slides rearwardly in the passage.

7. Apparatus as claimed in claim 6 including a bolt fixed to the suction plate and slidable in the cross member, and spring means urging the suction plate rearwardly.

8. Apparatus as claimed in claim 3 including means to receive and remove the tray released from the plate means.

9. Apparatus as claimed in claim 8 in which the receiving and removal means comprises a chute.

10. Apparatus as claimed in claim 3 in which the clamping means comprises a clamping plate fixed on the frame and a clamping head spaced from the clamping plate, the clamping head being advancable and retractable in the direction of the clamping plate.

11. Apparatus as claimed in claim 10 including spring means urging the clamping head towards the clamping plate, and cam actuated lever means bearing against the clamping head against the action of the spring means.

12. Apparatus as claimed in claim 3 in which the frame is tilted upwardly towards the guide means whereby the plate means is movable rearwardly by gravity.

13. Apparatus as claimed in claim 12 in which the means to move the plate means and the clamping means comprises a pair of cams and drive means for the cams, the plate means and the clamping means each including a follower bearing gravitationally one against each of the cams.

* * * * *